Patented May 14, 1940

2,200,928

UNITED STATES PATENT OFFICE 2,200,928

METHOD OF PRODUCING ELEMENTAL SULPHUR BY REACTION BETWEEN SULPHURETED HYDROGEN AND SULPHUR DIOXIDE

Axel Rudolf Lindblad, Stockholm, and Fritz Olov Herneryd, Skelleftehamn, Sweden, assignors to Imperial Chemical Industries Limited, London, England, a limited joint-stock company of Great Britain, and Bolidens Gruvaktiebolag, Stockholm, Sweden, a limited joint-stock company of Sweden No Drawing. Application December 15, 1938, Serial No. 245,986. In Sweden November 26, 1937

2 Claims. (Cl. 23—225)

Numerous are the attempts that have been made to produce elemental sulphur from sulphureted hydrogen and sulphur dioxide.

The conditions are simplest when one tries to carry through the reaction at a temperature so low, that the sulphur is separated in a solid state. In this case the following formula holds good:

$$4H_2S + 2SO_2 = 4H_2O + 6S_{\text{(rhombic crystals)}} + 69 \text{ kg. cal.} \quad (1)$$

The reaction heat thus possesses a high positive value and the state of equilibrium must thus be the more favorable the lower the temperature. To this has to be added the circumstance that when the sulphur is separated in a solid state it is removed from the gaseous phase and the equilibrium is displaced to the right.

Most methods intended to bring about a reaction between $H_2S$ and $SO_2$, thus work at an ordinary or slightly raised temperature. Often this reaction is carried out over some suitable catalyser, bog ore, hydrate of iron or the like, the sulphur formed being deposited on the catalyser.

The disadvantages of this process are, however, obvious. The sulphur must either be recovered from the catalyser by extraction or in some other way, or the catalyser inactive by reason of its sulphur content must be sold as such.

In many cases the process can for this reason not be carried out, because the cost of the recovery of the sulphur is far too high.

It will, of course, be quite natural to try to carry out the reaction at a temperature so high that the sulphur formed separates out in the form of vapor and may be recovered by cooling after the gas has passed the catalyser.

At a very high temperature for instance 900–1700° C. the formula of the reaction will be:

$$4H_2S + 2SO_2 \rightleftarrows 4H_2O + 3S_2 \text{ (gas)} - 15 \text{ kg. cal.} \quad (2)$$

On account of the negative heat of formation in this case, the state of equilibrium is the more favorable the higher the temperature. With a rising temperature the velocity of reaction increases, as is well known. The equilibrium is however in this reaction up to 1000° C. still very disadvantageous, but in addition thereto the disadvantage arises, that sulphureted hydrogen and sulphur dioxide are being regenerated. By working at so high temperatures one can thus not get any satisfactory reaction, to which have to be added the expenses and difficulties which are always entailed in the working at too high temperatures. The reaction according to the Formula 2 above prevails down to 600° C. although only a fraction $S_2$-molecules is associated to $S_6$-molecules.

Another possibility to carry out the reaction is to work at a lower temperature, so high however that the sulphur is still in a gaseous state, i. e. near the condensation point of the sulphur vapor formed. The reaction formula will then be:

$$4H_2S + 2SO_2 \rightleftarrows 4H_2O + \tfrac{3}{4}S_8 \text{ (gas)} + 67 \text{ kg. cal.} \quad (3)$$

The temperature limit downward is for this reaction determined by the lowest temperature at which the sulphur content of the gas after the reaction is still in the form of vapor. In this temperature interval, 120–450° C., the sulphur vapor contains only minor quantities of $S_2$-molecules, for which reason the reaction is going on according to the last named Formula 3, and it has been found that the state of equilibrium is quite satisfactory.

Hitherto it has, however, not been possible to carry out the reaction at this temperature interval (120–450° C.), because it has been found impossible to find a sufficiently effective catalyser.

From lengthy tests carried out by the inventors it has, however, been found out that one can practically convert sulphureted hydrogen and sulphur dioxide completely into elemental sulphur within the temperature interval of 120–450° C., or more nearly stated 200–300° C. by the use of catalysers consisting of one or more compounds of such a nature that at the reaction temperature here concerned they are capable of fixing or binding a larger or smaller quantity of water in the form of hydrate, water of crystallisation or in some other way.

The catalyser in this case probably acts in such a way that at one moment it takes up or loosely binds the water that is formed in the reaction, the equilibrium then being displaced to the right, and at the next moment gives off the water taken up. The compound or compounds used as catalysers thus possess the property of being able successively to take up and give off water at the temperature in question. Amongst substances or materials having the above stated advantageous properties cement (Portland- and smeltcement) and gypsum may be mentioned.

The tests carried out have further shown that the catalytical effect of the aforesaid compounds can be raised to a very high degree by adding or admixing sulphides of metal or other compounds which during reaction are able to form sulphides.

Thus it has, by way of example, been found that hydrate of iron or sulphide of iron, e. g.

sulphurous pyrites or pyrites concentrate, at a temperature of 200-400° C. is not by far able to bring about a chemical transformation or decomposition corresponding to the state of equilibrium at the temperature in question. If, on the other hand, these iron compounds are mixed with for instance cement or gypsum a transformation or decomposition almost equivalent to that theoretically possible is obtained also at a very high velocity of the gas.

What has been said hereinbefore about iron compounds also holds good for other compounds belonging to the iron group, thus also cobalt and nickel compounds and likewise aluminum and manganese compounds.

As an example on the results that may be obtained by this process it may be mentioned that, if a gas mixture containing 1% $H_2S$ and 0.5% $SO_2$, is, at 250-350° C. passed over a catalyser consisting of gypsum and pyrites concentrate such a complete conversion into elemental sulphur and water is gained, that only traces of $H_2S$ and $SO_2$ can be detected after the reaction.

Having thus described our invention we declare that what we claim is:

1. The process of producing elemental sulphur by contacting a mixture of hydrogen sulphide and sulphur dioxide with a catalyst comprising a substance which has the power to absorb water selected from the group consisting of Portland cement, smeltcement and gypsum, and a material from the group consisting of pyrites and pyrites concentrate.

2. A process according to claim 1 characterized in that the mixture of gases is contacted with the catalyst at a temperature substantially within the range 120° C. to 450° C.

AXEL RUDOLF LINDBLAD.
FRITZ OLOV HERNERYD.